July 7, 1925.
G. PIERCE
AUTOMOBILE HEADLIGHT
Filed April 5, 1924
1,544,859
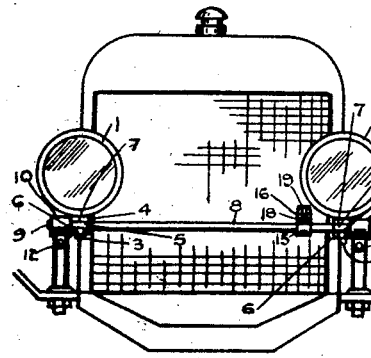
FIG. 1
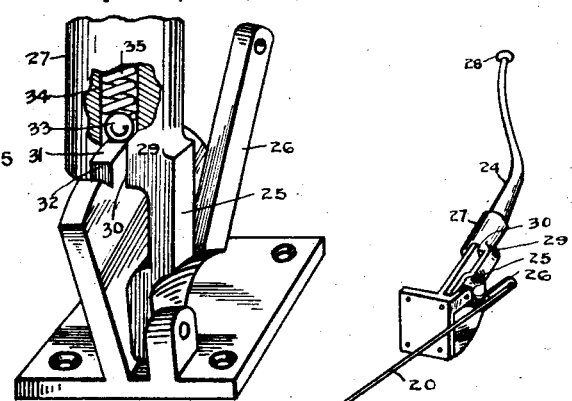
FIG. 4.
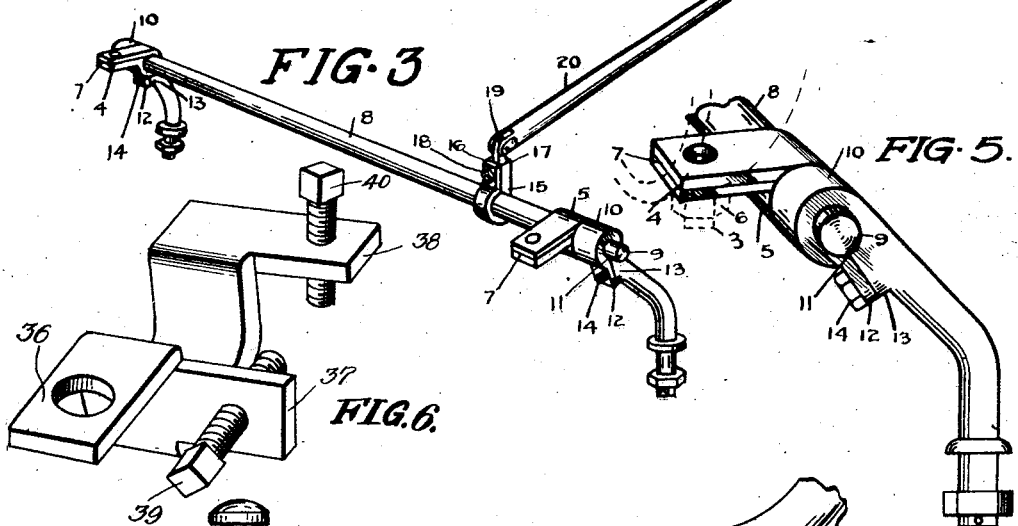
FIG. 3
FIG. 5.
FIG. 6.
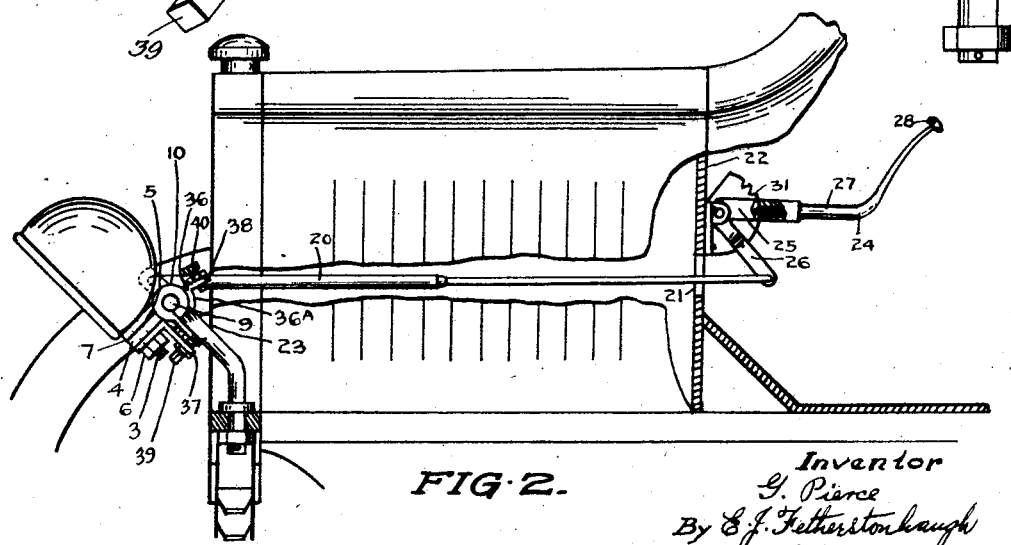
FIG. 2.
Inventor
G. Pierce
By E.J. Fetherstonhaugh
Attorney Patented July 7, 1925.

1,544,859

UNITED STATES PATENT OFFICE.

GEORGE PIERCE, OF MONTREAL, QUEBEC, CANADA.

AUTOMOBILE HEADLIGHT.

Application filed April 5, 1924. Serial No. 704,451.

*To all whom it may concern:*

Be it known that I, GEORGE PIERCE, a subject of the King of Great Britain, and residing at the city of Montreal, in the Province of Quebec, in the Dominion of Canada, have invented new and useful Automobile Headlights, of which the following is the specification.

The invention relates to automobile headlights, as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to eliminate the dangers incident to the glare of headlights in meeting other vehicles; to effect the dipping or tilting of the lamps in a simpler and more efficient manner, than in United States Patent No. 1,290,650, dated Jan. 7, 1919, to Paul and Elsey, and owned by me; to insure correct installation of the mechanism even by inexperienced persons; to afford every convenience possible to the driver; to accomplish all these purposes at a minimum expense bringing it within the reach of all classes of owners of cars; and generally to provide safety to persons and property in the operation of motor cars.

In the drawings, Figure 1 is a front view showing the lamps and the radiator end of the engine hood.

Figure 2 is a longitudinal sectional view of engine showing the operating connections.

Figure 3 is a perspective view of the complete mechanism apart from the car.

Figure 4 is an enlarged perspective view of lever and quadrant connection broken away to show the ball and spring.

Figure 5 is an enlarged perspective detail of the lamp mounting.

Like numerals of reference indicate corresponding parts in the various figures.

Referring to the drawings, the lamps 1 and 2 are carried in the usual positions for headlights and in fact the conventional practice in mounting the lamps is closely adhered to, so as to make it possible to adapt the mechanism generally to motor cars.

The lamps 1 and 2 each have a plug 3 fitting into a split socket 4, which extends from a collar 5, said lamps being secured in said sockets 4 by the bolts 6 drawing the socket parts together and closing the split 7. The closing of the split 7 clamps the collars 5 rigidly to the sleeve 8, the latter being mounted and turning on the fixed rod 9.

The rod 9 is rigidly secured in the brackets 10 and particularly in the split ringed ends 11 of said brackets, said ringed ends being clamped on said rod 9 by the split ring extensions 12 and 13 held together by means of the bolts 14.

The sleeve 8 is mounted on said rod 9 between the brackets 10 and extends at each end to the ringed ends 11 and really forms the lamp mounting. The brackets 10 consist of posts having vertical lower portions and inclined upper portions, the vertical portions being secured at their lower ends to the frame or chassis and the inclined portions extending upwardly and forwardly from the vertical portions.

The crank 15, also in the form of a ring having split extensions 16 and 17 drawn together by the bolt 18 in securing said ring on the sleeve 8, is formed with an eye 19 to which the connecting rod is pivotally secured, this connecting rod extending through the engine hood to and through the plate 21 at the dash 22 of the car and through the head 23.

The bell crank 24 is pivoted at its angle 25 and the short section 26 thereof is pivotally secured to the end of the connecting rod 20 while the long section 27 terminates in the handle 28 adjacent to the instrument board of the car.

The section 27 is recessed longitudinally and offset at 29 and slotted in said offset at 30 to receive the quadrant 31, which is notched at several places 32 to receive the spring-pressed ball 33 in the ball recess 34, the spring 35 being inserted behind said ball in said recess 34 in the lever 24.

In the operation of this invention, the driver on the approach of another vehicle presses downwardly on the handle notch. This action has the effect of tilting the lamp, so that the glare is directed to the ground and front wheels and only a comparatively narrow crescent of light is shown ahead, thereby minimizing the dangers incident to collision and ditching.

In mounting the lamp the plates 36 form stops and are secured between lamps and sockets and partially surround the sleeve mounting by the curved section 36ª and the lateral extending lugs 37 and 38 form the limit stops up and down. The stop lugs 37 and 38 are provided with set screws 39 and 40, forming adjustable abutments for engaging the brackets 10. The lugs 37 and 38 are spaced apart to receive the brackets between them, and they are located at the ends of the curved portion of the stop plate.

The mounting of the lamps is a very salient feature in this invention as also the graduated slip operation and in regard to the form it will be noted that rigid rod forms naturally a self aligning bearing for the tubular lamp mounting thereby eliminating all troubles in assembling and avoiding careless work by incompetent and inexperienced persons.

Further the tubular member also forms a distancing piece between brackets so that the bungle matters in the installation is almost impossible.

The rolling form of lever connection is very important because to do this by means of the regular toothed quadrant is quite objectionable to most drivers and takes much time and attention that should be given to the approaching vehicle.

What I claim is:—

1. An automobile headlight tilting mechanism comprising brackets mounted upon the frame of the machine and provided with bearings, a rod secured in the bearings and connecting the brackets, a rotary sleeve arranged on the rod and extending across the space between and aligning the brackets, lamps clamped on the ends of the sleeve in abutting relation to the brackets, and operating mechanism connected with the rotary sleeve for partially rotating the same to tilt the lamps, and to return them to an upright position.

2. An automobile headlight tilting mechanism comprising side brackets consisting of posts secured at their lower ends to the frame of the machine and provided at their upper ends with bearings, a transverse rod connecting the brackets and having its ends clamped in the bearings of the brackets, a rotary sleeve arranged on the rod and extending across the space between the brackets and aligning the same, sockets clamped to the sleeve in abutting relation to the brackets, lamps secured to the sockets and operating mechanism connected with the sleeve for partially rotating the same to tilt the lamps and to return them to an upright position.

3. In an automobile headlight tilting mechanism comprising spaced brackets consisting of posts secured at their lower ends to the frame of the machine and provided at their upper ends with bearings, said brackets being also provided with inclined upper portions extending forwardly, a transverse connecting rod secured in the bearings of the brackets, a rotary sleeve arranged on the rod and extending across the space between the brackets and abutting against the same, sockets clamped to the sleeve and abutting against the said bearings, lamps mounted on the sockets and operating mechanism connected with the sleeve for partially rotating the same.

4. An automobile headlight tilting mechanism comprising spaced brackets designed to be mounted on the frame of a machine, a rotary sleeve spacing and aligning the brackets, a stock plate rigid with the sleeve and having spaced lugs receiving the bracket between them and adapted to limit the rotary movement of the sleeve, and operating mechanism connected with the sleeve for partially rotating the same to tilt the lamps and return to an upright position.

5. An automobile headlight tilting mechanism comprising spaced brackets, a rotary sleeve spacing and aligning the brackets, lamps mounted on the sleeve and a stop plate having a curved portion extending partially around the sleeve and provided with terminal lugs spaced apart to receive a bracket between them, set screws mounted on the lugs and forming adjustable abutments for engaging the bracket, and means for partially rotating the shaft.

6. An automobile headlight tilting mechanism comprising spaced brackets, a rotary sleeve spacing and aligning the brackets, lamp sockets mounted on the sleeve adjacent the brackets, lamps carried by the sockets, stop plates secured to the sockets and having curved portions extending partially around the same and provided with terminal lugs spaced apart to receive the brackets and having means for engaging the same to limit the rotary movement of the sleeve, and operating mechanism connected with the sleeve for partially rotating the same.

7. In an automobile headlight, a lamp socket for said lamp, stop plates having lateral flanges thereon and set screws forming adjustable stops and inserted through said flanges, a rotatable mounting supporting said sockets a bearing for said mounting and brackets supporting said bearing from the vehicle frame.

Signed at Montreal, this 24th day of March 1924.

GEORGE PIERCE.